United States Patent [19]
Wagner

[11] 3,884,500
[45] May 20, 1974

[54] PRESSURE SENSING MEANS AND METHOD OF A PRESSURIZED CONTAINER MEANS AND SYSTEM UTILIZING THE SAME

[75] Inventor: Joseph P. Wagner, Knoxville, Tenn.

[73] Assignee: Robertshaw Controls Company, Richmond, Va.

[22] Filed: Apr. 17, 1974

[21] Appl. No.: 461,515

Related U.S. Application Data

[62] Division of Ser. No. 322,071, Jan. 8, 1973, Pat. No. 3,818,764.

[52] U.S. Cl. ............................................. 280/150 AB
[51] Int. Cl. ................................................ B60r 21/10
[58] Field of Search ........ 73/393, 418; 280/150 AB; 340/242; 200/81.8, 83 N, 83 A, 83 R

[56] References Cited
UNITED STATES PATENTS

| | | | |
|---|---|---|---|
| 2,877,326 | 3/1959 | Bourns | 73/418 X |
| 2,899,214 | 8/1959 | D'Antini | 280/150 AB X |
| 3,678,758 | 7/1972 | Lawrence | 200/81.8 |
| 3,735,376 | 5/1973 | Kermer et al | 340/242 |
| 3,761,655 | 9/1973 | Whelan et al | 200/81.8 |
| 3,774,150 | 11/1973 | Matsui | 280/150 AB X |

*Primary Examiner*—Kenneth H. Betts
*Attorney, Agent, or Firm*—Candor, Candor & Tassone

[57] ABSTRACT

A container having a pressurized fluid therein and a pressure sensing fluid operated device carried by the container for sensing pressure changes within the container. The sensing device is initially charged to same pressure level as the container and is disposed within the container so as to be substantially surrounded by the fluid therein and is thereby temperature compensated whereby pressure changes of the fluid in the container caused by temperature changes thereof are ineffective to cause sensing thereof by the sensing device as the fluid of the sensing device is at the same temperature as the fluid in the container. Such container can be utilized as the fluid pressure supply means for a vehicular air bag safety device.

7 Claims, 16 Drawing Figures

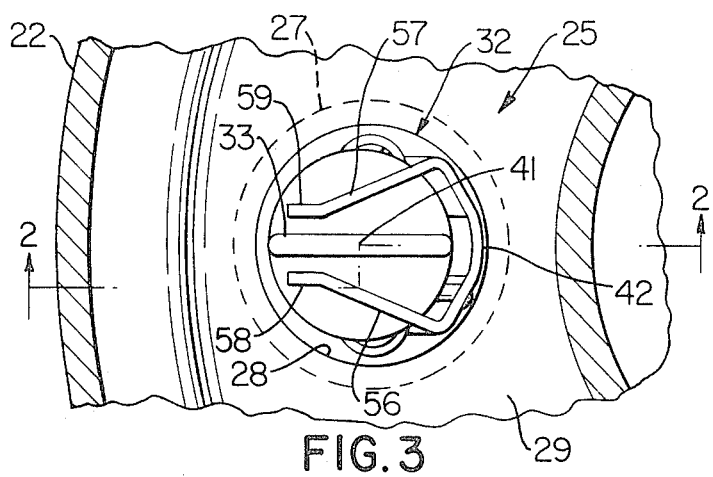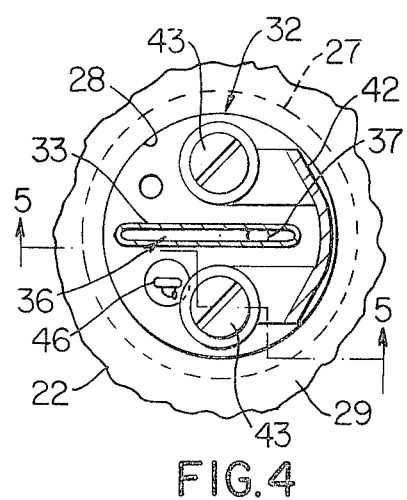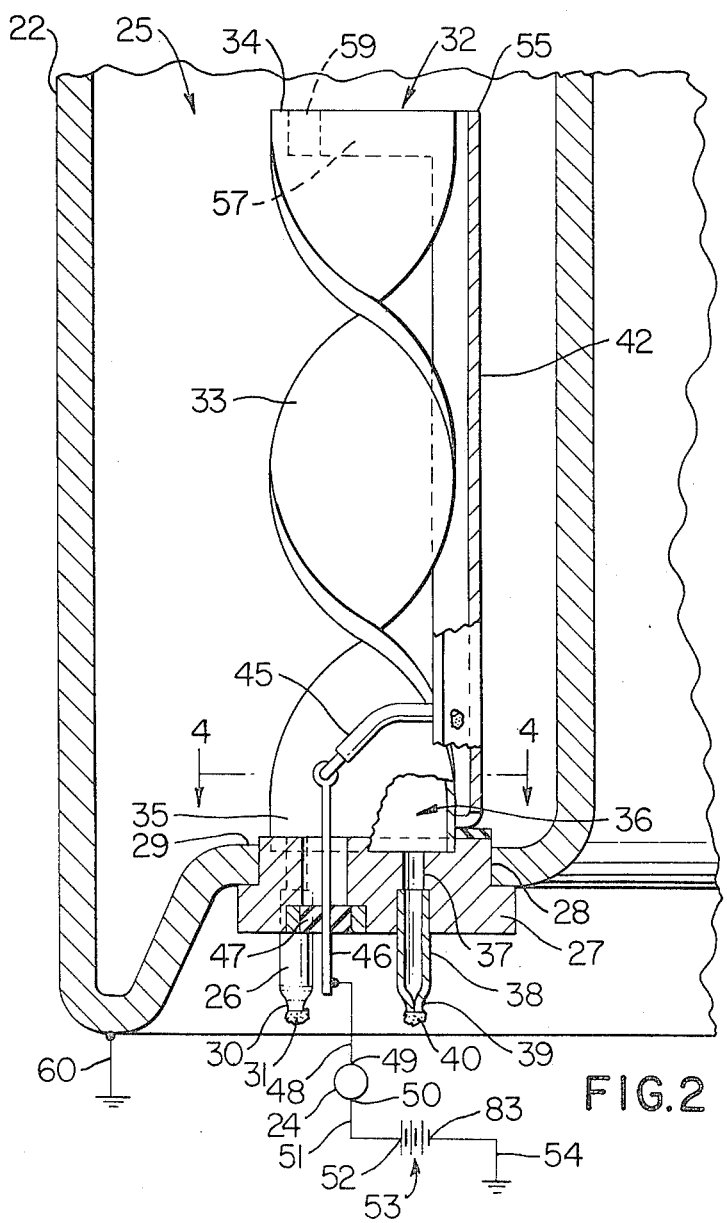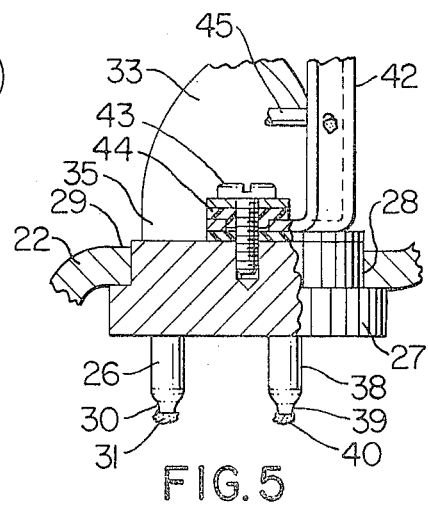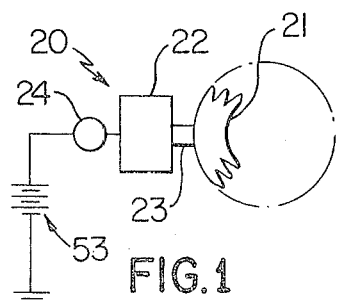

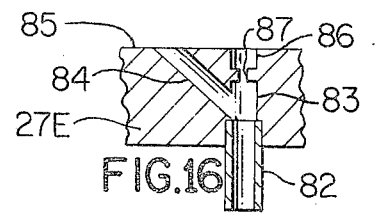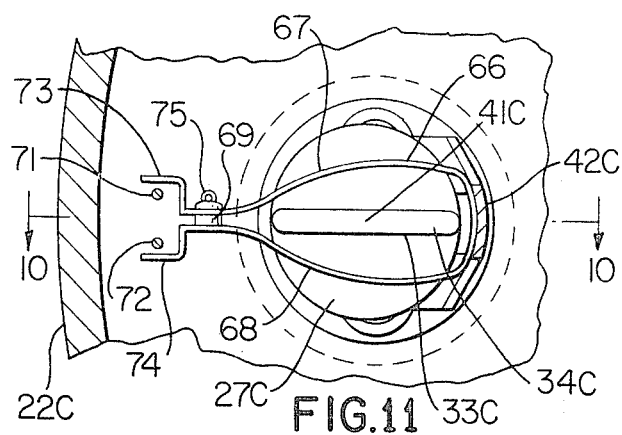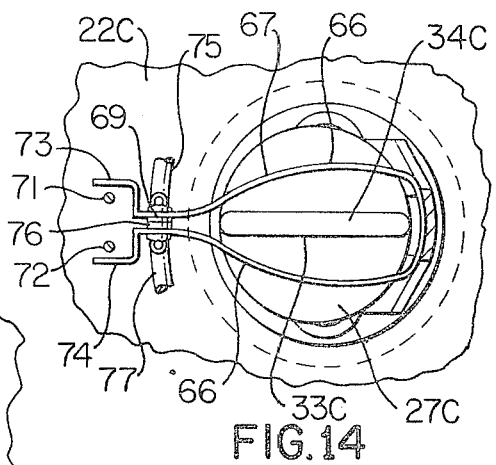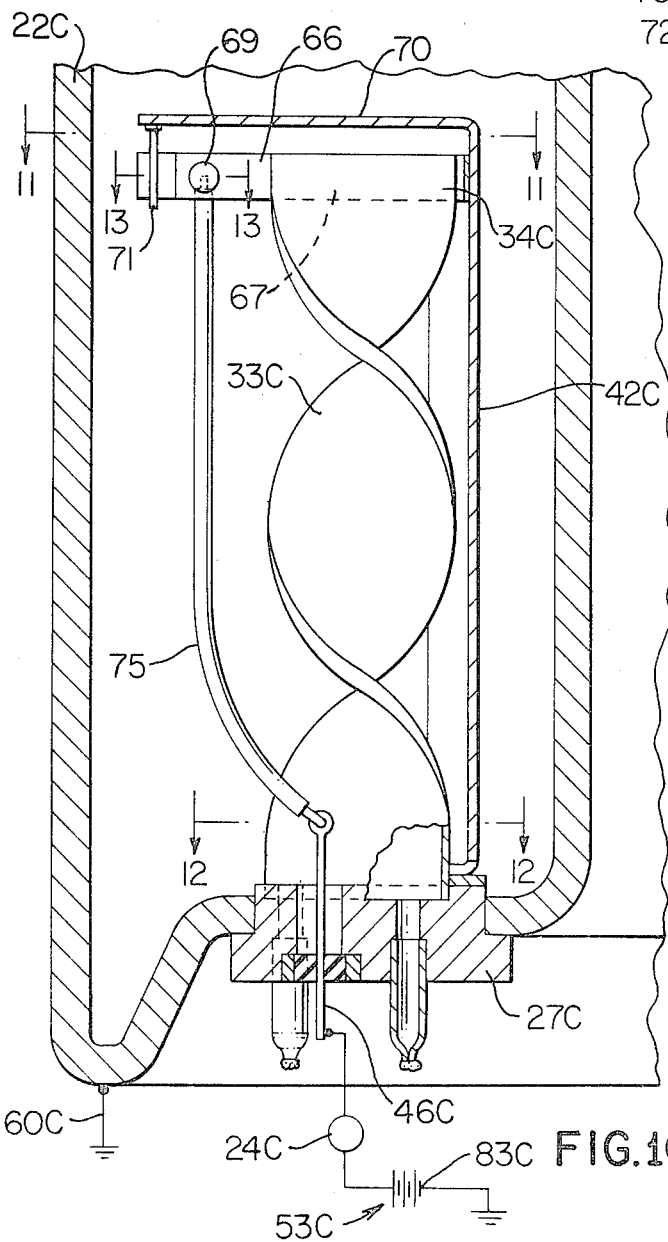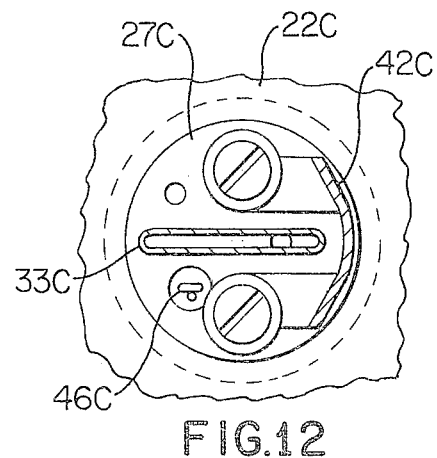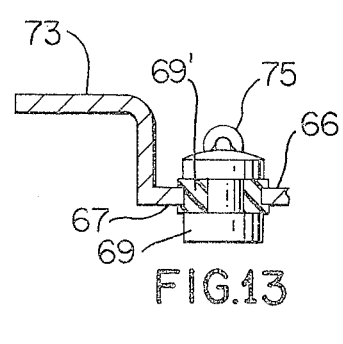

PRESSURE SENSING MEANS AND METHOD OF A PRESSURIZED CONTAINER MEANS AND SYSTEM UTILIZING THE SAME

This is a division of application Ser. No. 322,071, filed Jan. 8, 1973, now U.S. Pat. No. 3,818,764.

This invention relates to an improved means for sensing pressure changes within a pressurized container means as well as to an improved method and system utilizing such sensing means.

It is well known that a vehicular air bag safety system has now been provided wherein an inflatable bag is normally disposed in a collapsed, out of the way condition and is adapted to be almost instantaneously inflated by fluid pressure upon an impact of the vehicle with a harm producing object so as to protect one or more individuals in the vehicle being engaged by the thus inflated bag. In order to inflate such safety air bag, a container means must be provided for storage of such inflating fluid under pressure and in order for the system to function properly, the pressure in such container means must not increase or decrease beyond a predetermined amount when that container means is at a certain temperature.

For example, such fluid storage container means can each be charged with an inert gas, such as argon, helium, and the like, or a mixture of the same, to approximately 2400 psi at room temperature and such container means must be adapted to maintain the stored gas pressure so that the same does not drop by more than approximately 200 psi or does not gain more than 200 psi when at room temperature. Of course, such limits, as well as others hereinafter set forth, are by way of example only and are not intended in any manner to place restrictions on the scope of the claimed invention.

It is a feature of this invention to provide means for detecting any adverse loss or gain in the pressure in such pressurized container means caused by means other than temperature change, such as pressure changes that are caused by a leak in the container means or other damages of the container means.

In particular, one embodiment of this invention comprises a fluid operated sensing means that is initially charged to the same pressure level as the container means and is carried by the container means in such a manner that the sensing means is substantially surrounded by a reference pressure of the fluid of the container so as to be temperature compensated thereby whereby any pressure changes of the fluid in the container caused by temperature changes thereof are ineffective to cause a sensing thereof by the sensing means as the fluid of the sensing means is always at the same temperature as the fluid in the container. Such sensing means comprises a fluid operated means having a movable wall inside the container with the position of that movable wall being changed by a pressure differential existing across the same and operating an electric switch of a signal means to indicate when the pressure in the container means has changed from a desired value thereof to an undesired value thereof by means other than temperature change.

Thus, under extreme temperature variation conditions of the storage area for the fluid storage container for the vehicle air bag safety system, even though the same is inside the passenger compartment, the temperature of the fluid in the container means can reach 220° F. or −20° F. and under these ambient temperature conditions, the pressure within the container means can build to 3400 psi or go as low as 1700 psi at the extreme temperature conditions thereof even though the same is 2400 psi at room temperature. However, since the sensing device of this invention is temperature compensated by the fluid of the container itself, so that the temperature of the fluid of the fluid operated sensing device is the same as the temperature of the fluid in the container means, such pressure changes caused by extreme temperature conditions will not cause a false indication that the pressure within the container means has been adversely affected by means other than temperature.

Accordingly, it is an object of this invention to provide sensing means for a pressurized container means or the like, such sensing means having one or more of the novel features set forth above or hereinafter shown or described.

Another object of this invention is to provide an improved pressurized container means for a vehicular air bag safety means.

Another object of this invention is to provide an improved method of sensing pressure changes in a container means having a pressurized fluid therein.

Other objects, uses and advantages of this invention are apparent from a reading of this description which proceeds with reference to the accompanying drawings forming a part thereof and wherein FIG. 1 is a schematic view illustrating the vehicular air bag safety system of this invention.

FIG. 2 is an enlarged, fragmentary, cross-sectional view taken on line 2—2 of FIG. 3 and indicates the pressure sensing means of this invention mounted to the pressurized container means of the air bag safety system of FIG. 1.

FIG. 3 is a fragmentary, cross-sectional view looking down on the structure illustrated in FIG. 2 in the direction of the line 3—3 of FIG. 2.

FIG. 4 is a fragmentary, cross-sectional view taken substantially on line 4—4 of FIG. 2.

FIG. 5 is a fragmentary, cross-sectional view taken substantially on the line 5—5 of FIG. 4.

FIG. 10 is a view similar to FIG. 2 and illustrates another embodiment of this invention, FIG. 10 being taken on line 10—10 of FIG. 11.

FIG. 11 is a fragmentary, cross-sectional view taken substantially on line 11—11 of FIG. 10.

FIG. 12 is a cross-sectional view taken substantially on line 12—12 of FIG. 10.

FIG. 13 is an enlarged, fragmentary, cross-sectional view taken on line 13—13 of FIG. 10.

FIG. 14 is a view similar to FIG. 11 and illustrates still another embodiment of this invention.

FIG. 16 is a fragmentary view similar to FIG. 2 and illustrates another embodiment of this invention.

Figure 6:
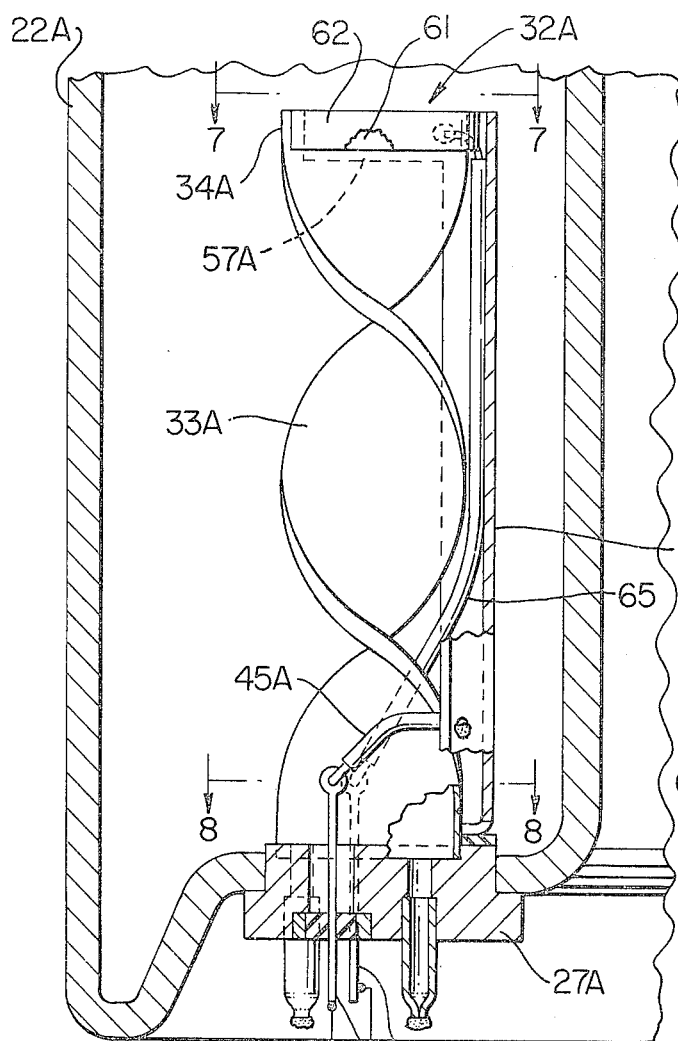
FIG. 6 is a view similar to FIG. 2 and illustrates another embodiment of this invention, FIG. 6 being taken substantially on the line 6—6 of FIG. 7.

While the various features of this invention are hereinafter described and illustrated as being particularly adaptable for providing pressure sensing means for the pressurized container means of a vehicular air bag safety means, it is to be understood that the various features of this invention can be utilized singly or in any combination thereof to provide sensing means for other devices as desired.

Therefore, this invention is not to be limited to only the embodiments illustrated in the drawings, because the drawings are merely utilized to illustrate one of the wide variety of uses of this invention.

Further, while various configurations and structural parts are illustrated, it is to be understood that this invention is not to be limited to such configurations or structural details as other configurations and structural designs can be utilized to accomplish the same results provided by the teachings of this invention.

Referring now to FIG. 1, a vehicular air bag safety system is generally indicated by the reference numeral 20 and comprises an air bag structure 21 adapted to be normally stored in a collapsed out of the way condition but being adapted to be substantially instantaneously inflated as schematically illustrated in FIG. 1 by being fluidly interconnected to a pressurized container means 22 by suitable means 23 that is actuated by an impact of the vehicle against a harm producing object in a manner well known in the art whereby the details of the same need not be further described in order to understand the features of this invention.

The system 20 of this invention includes a signal producing device 24, such as an alarm, lamp, or other indicator, which will be activated by a pressure sensing means of this invention in a manner now to be described when the pressure sensing means detects an adverse change in the pressure of the fluid in the storage container means 22.

As illustrated in FIGS. 2–5, the container means 22 has a chamber 25 therein adapted to be filled with pressurized fluid through a filling tube 26 carried by a plug member 27 sealingly fixed in any suitable manner in an opening 28 formed through a flattened portion of an end wall 29 of the container means 22. Once the chamber 25 has been pressurized with the desired fluid to the desired pressure under controlled temperature conditions, the tube 26 has its lower end 30 suitably closed and sealed by means 31 so as to prevent the loss of fluid pressure from the chamber 25 out through the tube 26.

The plug 27 also carries the pressure sensing means of this invention which is generally indicated by the reference numeral 32 and comprises a hollow ribbon-like bourdon tube 33 twisted in the manner illustrated in FIG. 2 between the opposed ends 34 and 35 thereof. The end 34 is suitably sealed closed if the tube 33 is formed from a hollow length or is already integrally closed if formed from a bulb-like length while the end 35 is sealed closed by the end plug 27 being secured thereto. However, the tube 33 has a chamber 36 therein disposed in fluid communication at the lower end 35 thereof with a passage 37 formed in the plug 27 and being fluidly interconnected to another filling tube 38. The bourdon-like tube 33 is adapted to be filled with fluid pressure through the filling tube 38 which is then adapted to have its lower end 39 sealed closed by sealing means 40 in the same manner as the filling tube 26 previously described.

In fact, the chamber 25 of the container means 22 and the chamber 36 of the bourdon tube 33 can be charged through the tubes 26 and 38 at the same time, at the same temperature and with the same fluid. In any event, the chamber 25 and the chamber 36 are simultaneously or separately charged to the same fluid pressure level while at the same temperature so that the pressure value within the chamber 36 of the bourdon tube 33 is exactly the same as the pressure value in the chamber 25 of the container means 22 whereby the pressure differential across the movable wall of the tube 33 initially is zero. However, any subsequent loss of pressure from the chamber 25 or loss of pressure from the chamber 36 of the tube 33 will cause pressure differential to exist across the wall of the tube 33 and cause the same to tend to twist or untwist about its longitudinal axis 41, FIG. 3, so that the end 34 will rotate in a clockwise or counterclockwise direction in FIG. 3 about the axis 41 as the case may be. Similarly, an increase in pressure in the chamber 25 over the chamber 36 or in the chamber 36 over the chamber 25 will cause a pressure differential across the wall of the tube 33 to cause the end 34 thereof to rotate about the axis 41 in a clockwise or counterclockwise direction as the case may be.

Since the bourdon tube 33 of the sensing means 32 of this invention is disposed within the chamber 25 of the container means 22, any outside ambient temperature changes tending to cause the pressure value of the fluid in the chamber 25 to vary, will likewise cause the pressure value of the fluid in the chamber 36 of the sensing means 32 to vary in a like manner so that the same, in effect, cancel each other as the bourdon tube 33 is substantially completely surrounded by the fluid in the chamber 25 of the container means 22 so that pressure changes caused by temperature will not cause the bourdon tube 33 to rotate about the axis 41 as the pressure differential across the movable wall thereof remains exactly the same whether the temperature of the fluid in the chamber 25 is at an extreme hot condition or at an extreme cold condition.

The means for detecting the movement of the end 34 of the tube 33 about the axis 41 thereof because of a resulting pressure differential existing across the wall of the tube 33 will now be described.

A conductive bracket member 42 is mounted to the conductive end plug 27 by fastening members 43, FIG. 5, but is electrically insulated therefrom by insulating means 44. However, the bracket 42 is electrically interconnected by a lead 45 to a terminal 46 passing out of the end plug 27 while being electrically insulated therefrom by an insulating means 47.

The terminal 46 is adapted to be interconnected by a lead 48 to one side 49 of the indicator 24 while the other side 50 of the indicator 24 is adapted to be interconnected by a lead 51 to one side 52 of an electrical power source 53 having its other side 83 interconnected to ground by a lead 54.

The upper end 55 of the bracket 42 has a pair of arms 56 and 57 respectively bent in the configuration illustrated in FIGS. 2 and 3 so as to be adjacent the upper end 34 of the bourdon tube 33. However, the arms 56 and 57 respectively have ends 58 and 59 disposed spaced from the end 34 of the bourdon tube 33 as illustrated in FIG. 3 so that as long as the pressure differential across the wall of the tube 33 is zero, the end 34 of the tube 33 is equally spaced from the ends 58 and 59 of the arms 56 and 57 in the manner illustrated in FIG. 3. If the pressure differential across the wall of the tube 33 increases, the end 34 of the tube 33 begins to rotate about the axis 41 and when such rotation is sufficient to cause the end 34 of the tube 33 to contact either the end 58 of the leg 56 or the end 59 of the leg 57, the indicator 24 is activated by the sensing means 32 to indicate that an adverse loss or gain in pressure exists in the container means 22 so that the same must be checked.

In particular, the bracket 42 is interconnected to ground through such contacted leg 56 or 57, bourdon tube 33, end plug 27 and the container 22 as the container 22 is itself grounded by a lead means 60 whereby current is permitted to flow through the indicator 24 to cause its warning condition.

Thus, in the operation of the system 20, as long as the pressure sensing means 32 is sensing that the pressure value of the fluid in the chamber 25 is within acceptable limits from the initial charging pressure value for the chamber 25, the end 34 of the tube 33 is out of contact with the legs 56 and 57 of the bracket means 42 so that no current can flow through the indicator 24 and the same remains dormant. However, upon a loss or a gain of pressure in the chamber 25 to cause the end 34 of the tube 33 to rotate about the axis 41 sufficiently to cause the end 34 to contact one of the legs 56 or 57 of the bracket means 42, an electrical circuit is completed across the indicator 24 so that same will indicate that there is in sufficient pressure or too great a pressure in the chamber 25 of the container means 22 for proper operation of the vehicular air bag sensing system 20 of FIG. 1.

From the above, it can be seen that an improved pressure sensing means and method are provided by this invention because the inside of the bourdon tube 33 is charged to the same pressure value that exists inside the container means 25 at a given temperature so that with a change of temperature of the fluid within the container 22 and the resulting increase or decrease of pressure value thereof, such temperature change and, thus, pressure value change is equally applicable to the pressure fluid within the bourdon tube 33 to thereby cancel each other out. Thus, if a leak occurs in the container means 22, the pressure value thereof will drop. However, the pressure in the bourdon tube 33 remains the same and a pressure differential exists across the same causing the tube 33 to deflect and make, in effect, contact with the terminal means 42 completing a circuit which will give an indication on the dashboard of the vehicle where the indicator 24 would normally be mounted.

With the bourbon tube 33 being inside the container means 22, the tube 33 feels the same temperature as the fluid in the chamber 25 of the container means 22.

In a similar manner, should a leak occur from inside the bourdon tube 33 to the outside of the container means 22, the other leg 56 or 57 of the bracket means 42 will be contacted by the end 34 of the tube 33 producing a signal indicating that a malfunction exists in the container means 22.

Figure 7:
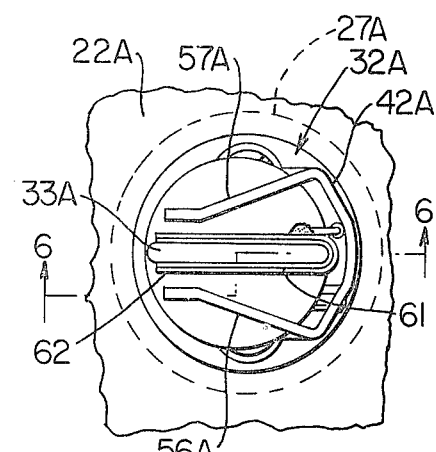
FIG. 7 is a fragmentary, cross-sectional view looking downwardly on the structure illustrated in FIG. 6 in the direction of the line 7—7 of FIG. 6.
Figure 8:
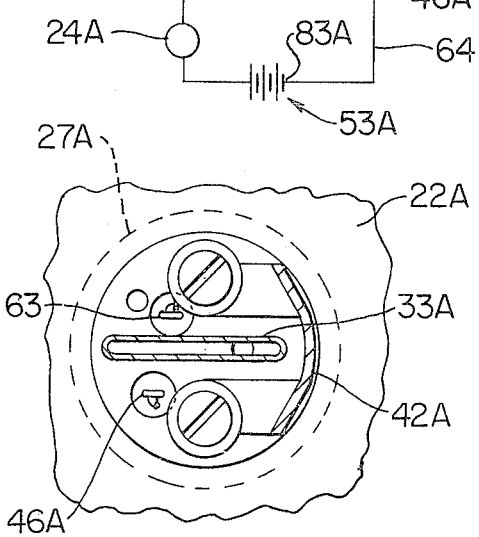
FIG. 8 is a fragmentary, cross-sectional view taken substantially on line 8—8 of FIG. 6.

Should it be desired to not utilize the container means 22 as a current flow path for completing the electrical circuit for the indicator 24, the arrangement illustrated in FIGS. 6–8 can be utilized and parts thereof similar to the parts of the container means 22 and sensing means 32 of FIGS. 2–5 are indicated by like reference numerals in FIGS. 6–8 followed by the reference letter "A."

As illustrated in FIGS. 6 and 7, the sensing means 32A for the container means 22A is substantially identical to the sensing means 32 previously described except that the upper end 34A of the bourdon tube 33A has an insulative sleeve or member 61 disposed thereon and over which is mounted a conductive sleeve or member 62 whereby the insulative sleeve 61 completely electrically insulates the outer conductive sleeve 62 from the bourdon tube 33A.

The end plug 27A has another terminal 63 carried thereby and insulated therefrom in the same manner as the terminal 46A whereby the terminal 63 is adapted to be interconnected to the other side 83A of the electrical power source 53A by a lead 64. The terminal 63 is also interconnected to the conductive sleeve 62 on the end 34A of the bourdon tube 33A by a lead 65.

In this manner, it can be seen that when the end 34A of the bourdon tube 33A has the conductive member 62 thereon in contact with one of the legs 56A or 57A of the bracket means 42A, a circuit is completed to cause the indicator 24A to indicate a malfunction of the container means 22A in the manner previously described for the container means 22 of FIG. 2 and no current flows through the wall of the container means 22.

While the sensing means 32 of this invention has been illustrated as being mounted in a flattened portion of the end wall 29 of the container 22, it is to be understood that the sensing means 32 of this invention could be arranged in an angular manner if desired.

Figure 9:
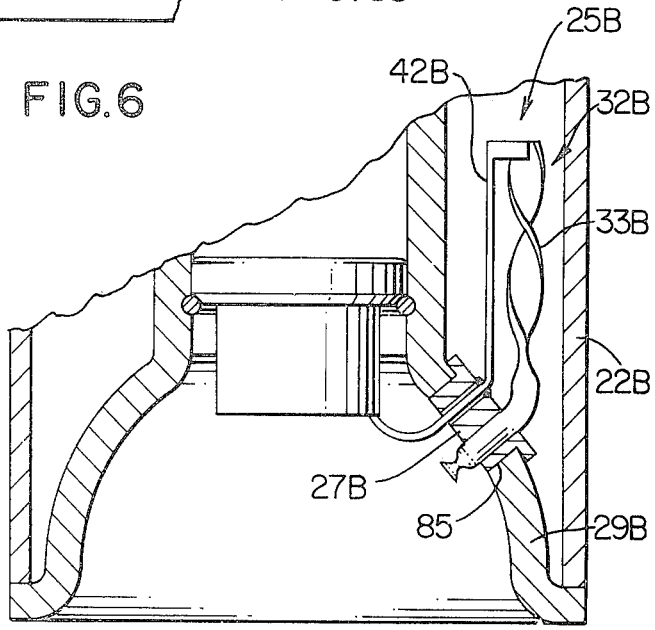
FIG. 9 is a view similar to FIG. 6 and illustrates another embodiment of this invention.

For example, reference is now made to FIG. 9 wherein another arrangement of this invention is provided and parts thereof similar to the arrangement of FIG. 2 are indicated by like reference numerals followed by the reference letter "B".

As illustrated in FIG. 9, the end wall 29B of the container means 22B is substantially dome-shaped and the end plug 27B of this invention is mounted in an opening 85 formed through such dome-shaped end wall 29B. However, the bourdon tube 33B and bracket means 42B are angularly bent to permit the same to pass through the opening 85 and then upwardly into the chamber 25B when the end plug 27B is mounted in place. The sensing means 32B functions in the same manner as the sensing means 32 previously described.

While the sensing means 32, 32A and 32B have been previously described as respectively completing a circuit when an adverse pressure differential is sensed by the same, it is to be understood that the sensing means could be arranged to open an electrical circuit upon an adverse pressure differential being sensed by the same.

Therefore, reference is now made to FIGS. 10–13 wherein another arrangement of this invention is provided and parts thereof similar to the parts of the arrangement of FIG. 2 are indicated by like reference numerals followed by the reference letter "C".

As illustrated in FIGS. 10 and 11, the bracket means 42C is not provided with the legs 56 and 57 previously described but carries a horseshoe-shaped spring member 66 having a pair of arms 67 and 68 respectively disposed on opposite sides of the upper end 34C of the bourdon tube 33C with the leg 67 carrying an electrical contact 69 electrically insulated from the leg 67 while being adapted to normally contact against the leg 68 in the manner illustrated in FIG. 11 when the bourdon tube 33C is not sensing an adverse pressure differential across the wall of the same.

The bracket 42C has an upper arm 70 provided with a pair of depending stop pins 71 and 72 extending downwardly therefrom and being respectively disposed adjacent L-shaped ends 73 and 74 of the spring legs 67 and 68 for a purpose hereinafter described.

The terminal 46C for the indicator 24C is interconnected by a lead 75 to the contact 69. Thus, as long as the contact 69 is in contact with the leg 68 in the manner illustrated in FIG. 11, an electrical circuit is completed for the indicator 24C through the bracket 42C which is electrically interconnected to the end plug 27C rather than being electrically insulated therefrom as is the case with the bracket means 42 previously described. Thus, since the bracket 42C is now electrically interconnected to the container 22C, the container 22C completes the circuit to ground through the lead means 60C previously described. In this manner, the indicator 24C will indicate that no adverse pressure condition exists as long as current flows through the same.

However, upon an adverse pressure differential being sensed by the bourdon tube 33C, the end 34C thereof rotates about the axis 41C and moves either the leg 68 or the leg 67 away from the other leg and while the natural spring of the other leg is to follow such movement, the respective stop pin 71 or 72 prevents such following movement so that the engaged leg moves away from the other leg so that the contact 69 now breaks contact with the leg 68 and thus, interrupts the circuit through the indicator 24C so that the same will produce its indicating function upon the breaking of the electric circuit thereto.

As illustrated in FIG. 13, the contact 69 for the leg 67 of the spring member 66 is electrically fastened thereto and electrically insulated therefrom by a rubber grommet like member 69'.

Of course, the other leg 68 could likewise carry a contact thereon which will be electrically insulated therefrom so that the other side 83C of the power source 53C could be directly interconnected thereto in the same manner as provided by the arrangement illustrated in FIG. 6.

Thus, reference is made to FIG. 14 wherein it can be seen that the other leg 68 has a contact 76 carried thereby and is electrically insulated therefrom in the same manner as the contact 69 while being adapted to be interconnected by a lead 77 to the other side 83C of the power source 53C by an additional terminal electrically insulated and carried by the end plug 27C in the same manner as the terminal 63 previously described.

While the bourdon tube 33C of the embodiments of FIGS. 11 and 14 has been described as acting on only one of the legs 67 or 68 of the horseshoe-shaped spring member 66 to move the same away from the other leg while having stop means 71 or 72 to prevent that other leg from following such movement, it is to be understood that the bourdon tube 33C itself could be utilized to act on both legs 67 and 68 to cause movement thereof away from each other to open the circuit therebetween.

Figure 15:
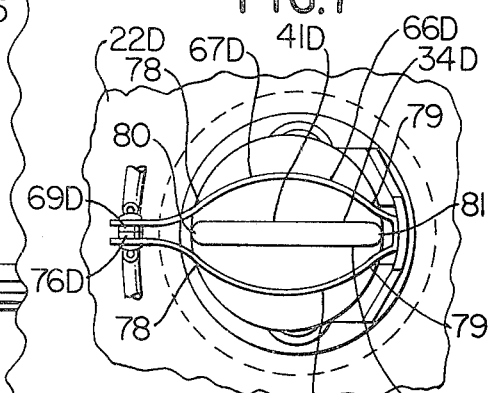
FIG. 15 is a view similar to FIG. 14 and illustrates another embodiment of this invention.

For example, reference is now made to FIG. 15 wherein another embodiment of this invention comprises a container means 22D and parts thereof similar to the parts of the other arrangements are indicated by like reference numerals followed by the reference letter "D".

As illustrated in FIG. 15, the spring member 66D has the legs 67D and 68D thereof so constructed and arranged relative to the upper end 34D of the bourdon tube 33D that each leg 67D and 68 D respectively has parts 78 and 79 thereof disposed an equally spaced distance from the opposed ends 80 and 81 of the bourdon tube 33D under normal pressure conditions so that when the bourdon tube 33D rotates about its longitudinal axis 41D for the reasons previously set forth, and should the same be rotating in a clockwise direction in FIG. 15, it can be seen that the opposed end 80 of the tube 33D will contact the part 78 of the leg 67D while the end 81 will likewise contact the part 79D of the leg 68D. Further clockwise rotation of the tube 33D will cause the legs 67D and 68D to be moved away from each other by the rotating tube 33D so that the contacts 69D and 76D are moved away from each other to break the circuit therebetween without having one of the legs 67D or 68D being held stationary by stop means as in the embodiment of FIGS. 11 and 14.

Conversely, should the tube 33D be rotating in a counterclockwise direction in FIG. 15, it can be seen that the end 81 of the tube 33D will contact the part 79 of the leg 67D while the end 80 thereof will contact the part 78 of the leg 68D to cause the legs 67D and 68D to move away from each other upon further counterclockwise rotation of the tube 33D relative to the container 22D so that the contacts 69D and 76D are moved away from each other to break the circuit therebetween for the reasons previously set forth.

While the various arrangements previously described each has separate filling means for the bourdon tube and the main propellant container, it is to be understood that a single fill passage could be provided for simultaneously charging the bourdon tube and the main container so that the same will have the same fluid pressure therein at all times and in a simultaneous manner. Thus, when the desired pressure level is reached, both the inside of the bourdon tube and the inside of the main container will be charged with the same fluid and at the same pressure levels.

For example, reference is now made to FIG. 16 wherein another embodiment of the end plug 27E for carrying the bourdon tube and switch means in the manner previously described is illustrated and has a single fill tube 82 leading to an internal passage 83 formed in the end plug 27E. The passage 83 has one branch 84 thereof leading to the exterior surface 85 of the plug 27E for charging the main chamber of the main container containing the same whereas another branch passage 86 leads from the passage 83 to a point that will be covered by the bourdon tube for charging the interior chamber of such bourdon tube in the manner previously described for the passage 37 of the embodiment illustrated in FIG. 2.

In order to insure that the bourdon tube will be filled at the same rate as the main chamber of the main container, the branch passage 86 can be provided with a restrictor means 87 therein as illustrated.

Thus, it is believed that when it is desired to charge the main container and the bourdon tube therefor through the end plug 27E of FIG. 16, the fluid pressure source can be attached to the fill tube 82 in any suitable manner and the same will permit the main container to be charged through the branch passage 84 while the bourdon tube is being charged through the branch passage 86 so that when the desired pressure level in the main container is reached, the same pressure level will have been reached in the bourdon tube so that the fill tube 82 can be subsequently sealed off in the manner previously described for the fill tubes 26 and 38.

However, before the tube 82 is sealed closed and after the main container and bourdon tube have been charged through the respective passages 84 and 86, the passages 84 and 86 must be isolated from each other and this can be accomplished by driving a ball seal into the passage 83 to close the passage 86 from the passage 84. It is believed that such ball sealing can be accomplished under pressure with a suitable charging device.

Thus, it can be seen that the end plug 27D can be utilized to simultaneously charge the main container and the pressure sensing device so that the same will be charged with the same fluid, at the same time and with the same pressure values.

Therefore, it can be seen that this invention not only provides improved pressure sensing means and methods, but also this invention provides an improved vehicular air bag safety system.

While the form and method of the invention now preferred have been disclosed and described as required by the patent statutes, it is to be understood that other forms and methods can be utilized and still come within the scope of the appended claims.

What is claimed is:

1. In combination, a vehicular air-bag safety means adapted to be inflated upon the detection of vehicular impact, a container means having a pressurized fluid therein for inflating said air-bag safety means when fluidly interconnected thereto, fluid operated sensing means carried by said container means for sensing pressure changes within said container means, and detection means operatively associated with said sensing means to indicate when said sensing means is sensing a loss or a gain of pressure in said container means beyond desired limits thereof, said sensing means and said container means being so constructed and arranged that said sensing means is temperature compensated by being substantially surrounded by a reference pressure of said fluid of said container means so that pressure changes of said fluid in said container means caused by temperature changes thereof are ineffective to cause sensing thereof by said sensing means as said fluid of said sensing means is at the same temperature as said fluid in said container means, said fluid operated sensing means and said container means having been initially charged with their respective pressurized fluids to substantially the same pressure levels.

2. A combination as set forth in claim 1 wherein said sensing means comprises a fluid operated bourdon tube means.

3. A combination as set forth in claim 1 wherein said fluid operated means has fluid therein of the same type as the fluid in said container means.

4. A combination as set forth in claim 1 wherein said fluid operated sensing means has a movable wall that moves in accordance with changes in the pressure differential across the same, said wall having said fluid of said fluid operated means acting on one side thereof and said reference fluid of said container means acting on the other side thereof.

5. A combination as set forth in claim 4 wherein said detection means comprises an electrical switch, said movable wall of said fluid operated sensing means being adapted to operate said electrical switch in response to certain movement thereof whereby said operated switch signals a loss or a gain of pressure in said container means beyond desired limits thereof.

6. A combination as set forth in claim 5 wherein said sensing means has said movable wall located inside said container means whereby said reference pressure fluid is the fluid inside said container means acting on said other side thereof.

7. A combination as set forth in claim 6 wherein said fluid operated sensing means comprises a twisted bourdon tube having a free end that comprises said movable wall and which will rotate about the longitudinal axis of said tube upon changes in the pressure differential across the same.

* * * * *